United States Patent
Gadjali (10) Patent No.: US 9,658,454 B2
(45) Date of Patent: May 23, 2017

(54) EYEWEAR DISPLAY SYSTEM PROVIDING VISION ENHANCEMENT

(71) Applicant: OMNIVISION TECHNOLOGIES, INC., Santa Clara, CA (US)

(72) Inventor: Hasan Gadjali, Fremont, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 167 days.

(21) Appl. No.: 14/020,516

(22) Filed: Sep. 6, 2013

(65) Prior Publication Data

US 2015/0070596 A1 Mar. 12, 2015

(51) Int. Cl.
*G02F 1/1335* (2006.01)
*G02B 27/01* (2006.01)
*G02B 5/30* (2006.01)

(52) U.S. Cl.
CPC .......... *G02B 27/0172* (2013.01); *G02B 5/30* (2013.01); *G02B 27/017* (2013.01); *G02B 2027/014* (2013.01); *G02B 2027/0118* (2013.01); *G02B 2027/0138* (2013.01); *G02B 2027/0178* (2013.01)

(58) Field of Classification Search
CPC .................. G02B 5/30; G02B 27/0172; G02B 2027/0138; G02B 2027/014; G02C 7/08
USPC .......................................................... 349/13
See application file for complete search history.

(56) References Cited

U.S. PATENT DOCUMENTS

| 5,572,343 A | * | 11/1996 | Okamura | G02B 27/017 345/8 |
| 5,777,715 A | | 7/1998 | Kruegle et al. | |
| 6,215,532 B1 | * | 4/2001 | Takagi | G02B 27/0101 345/7 |
| 6,307,526 B1 | | 10/2001 | Mann | |

(Continued)

FOREIGN PATENT DOCUMENTS

| CN | 1707308 A | 12/2005 |
| CN | 101048693 A | 10/2007 |

(Continued)

OTHER PUBLICATIONS

TW Application No. 102139615—Taiwanese Office Action and Search Report, with English Translation, issued Mar. 13, 2015 (13 pages).

(Continued)

*Primary Examiner* — Paisley L Arendt
(74) *Attorney, Agent, or Firm* — Blakely Sokoloff Taylor & Zafman LLP (57) ABSTRACT

An eyewear display system includes a camera coupled to capture an image of an object in a surrounding environment. A projector is coupled to receive the captured image to output a projected image. A polarizing beam splitter optically coupled to receive the projected image and an actual view of the surrounding environment. The polarizing beam splitter is optically coupled to output a combined view of the projected image combined with the actual view of the surrounding environment. The combined image is to be directed to an eye of a user. An intensity controller is optically coupled between the surrounding environment and the polarizing beam splitter to controlling an intensity of the actual view of the surrounding environment received by the polarizing beam splitter.

11 Claims, 4 Drawing Sheets

(56) References Cited

U.S. PATENT DOCUMENTS

| | | | |
|---|---|---|---|
| 6,672,724 B1 * | 1/2004 | Peterson | H04N 9/3152 348/E9.027 |
| 6,693,749 B2 * | 2/2004 | King | G02B 27/0172 359/485.05 |
| 7,751,122 B2 | 7/2010 | Amitai | |
| 7,791,804 B2 | 9/2010 | Moliton | |
| 8,182,084 B2 | 5/2012 | Kozaki et al. | |
| 8,471,967 B2 * | 6/2013 | Miao et al. | 349/11 |
| 8,786,686 B1 * | 7/2014 | Amirparviz | H04N 13/04 345/8 |
| 2012/0154557 A1 | 6/2012 | Perez et al. | |
| 2012/0194551 A1 * | 8/2012 | Osterhout | G02B 27/0093 345/633 |
| 2012/0242678 A1 | 9/2012 | Border et al. | |
| 2012/0249899 A1 | 10/2012 | Berthelot et al. | |
| 2013/0063486 A1 * | 3/2013 | Braun et al. | 345/633 |
| 2013/0113903 A1 | 5/2013 | Lazaridis et al. | |
| 2013/0131985 A1 | 5/2013 | Weiland et al. | |
| 2013/0147826 A1 * | 6/2013 | Lamb | 345/589 |

FOREIGN PATENT DOCUMENTS

| | | |
|---|---|---|
| CN | 102654644 A | 9/2012 |
| CN | 102754014 A | 10/2012 |
| CN | 102906623 A | 1/2013 |
| CN | 103149669 A | 6/2013 |
| EP | 2624217 A1 | 8/2013 |
| TW | 201228380 A | 7/2012 |
| WO | WO 2013/028586 A1 | 2/2013 |

OTHER PUBLICATIONS

CN Patent Application No. 201310596285.5—Chinese Office Action and Search Report, with English Translation, issued May 17, 2016 (19 pages).

* cited by examiner

432
A camera captures the image of an object that cannot be seen clearly by a user in the actual view of the surrounding environment.

434
A digital processor processes the captured image, including adjusting the magnification of the image.

436
A projector projects the captured and processed image.

438
A beam splitter combines the projected image and the actual view and directs the combined view to the eye of a user such that both the projected image and the actual view appear at the same time in a transparent display window to the user.

440
An intensity controller controls the intensity of the actual view, so the user can see naturally and comfortably the projected image simultaneously with the actual view as background.

442
The user that may have poor vision can see clearly the projected image, and at the same time can be aware of the actual view of the surrounding scene, although the actual view may appear blurry compared to the projected image.

FIG. 4

EYEWEAR DISPLAY SYSTEM PROVIDING VISION ENHANCEMENT

BACKGROUND INFORMATION

Field of the Disclosure

The present invention relates generally to an eyewear display, and more specifically, to an eyewear display system that provides enhanced vision.

Background

Various eyewear displays that utilize pico projectors using LCOS (liquid crystal on silicon) display panels are available. These eyewear displays are also known as near eye displays or near to eye displays. Eyewear displays may be utilized for displaying interactive computer displays that can be seen by the user simultaneously while the user sees the view around him. The user may use his or her voice or other means to control the interactive display as well as other connected devices. For example, a user may operate his or her mobile phone that is connected to the eyewear display without using his or her hands and without have to look away from the surrounding view through the eyewear.

An eyewear display is also known as a HMD, which stands for head mounted display or helmet mounted display. Traditionally, the user will see the view displayed on the goggle of the HMD in a single non-stereoscopic scene or in a stereoscopic scene, but the display is not transparent type. The single display HMDs are mostly used in military operation, for example displaying an IR scene for an eye, while the other eye can see the ambient view. The stereoscopic HMDs have been successfully developed and used in military and medical trainings as well as game applications.

A growing number of people have poor vision that can no longer be improved with conventional corrective lenses, surgery or medical treatment. The number of Americans affected by age-related eye diseases is currently expected to double from 12 million to 24 million by 2020. Patients of all ages require low vision aids in order to sustain their active lifestyle, and high quality of life.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Example methods and apparatuses directed to an eyewear display system providing vision enhancement are disclosed. Users that suffer with poor eyesight can utilize portable and multifunctional low vision aids in accordance with the teachings of the present invention in order to sustain their active lifestyle and high quality of life. Examples in accordance with the teachings of the present invention can provide aid to individuals with macular degeneration, diabetic retinopathy, and other degenerative eye diseases that cause poor eyesight in individuals.

As will be disclosed, an example eyewear display system providing vision enhancement according to the teachings of the present invention may include a camera that captures images of objects that cannot be seen clearly by a user that suffers from poor eyesight. The images captured by the camera can be seen more clearly by a person using an example eyewear display system attached to eyeglasses in accordance with the teachings of the present invention.

Figure 1:
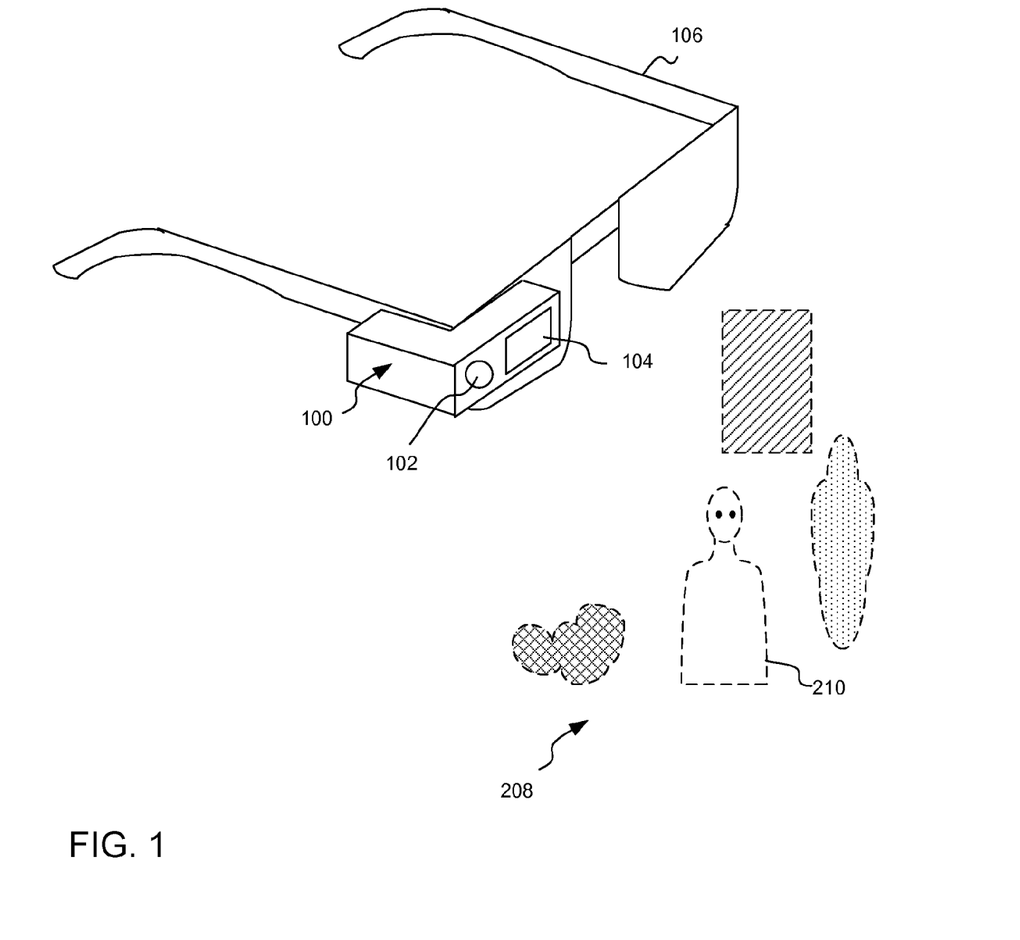
FIG. 1 is a diagram illustrating one example of an eyewear display system attached to eyeglasses in accordance with the teachings of the present invention.

To illustrate, FIG. 1 is a diagram illustrating one example of an eyewear display system 100 attached to eyeglasses 106 in accordance with the teachings of the present invention. In one example, the eyewear display system 100 is adapted to be attached to eyeglasses 106 with clips, fasteners, or the like. In another example, eyewear display system 100 may be attached to eyeglasses 106 by glue, adhesive, or any other suitable bonding material in order to attach eyewear display system 100 to eyeglasses 106. In one example, eyewear display system 100 includes a camera 102 and a transparent display window 104. In operation, a user wearing eyeglasses 106 sees an image that appears projected in transparent display window 104 while the user simultaneously sees the actual view of a surrounding environment 208 in the background through transparent display window 104. In one example, the image projected in the transparent display window 104 may be an image that is captured by camera 102 with or without digital processing.

Figure 2A:
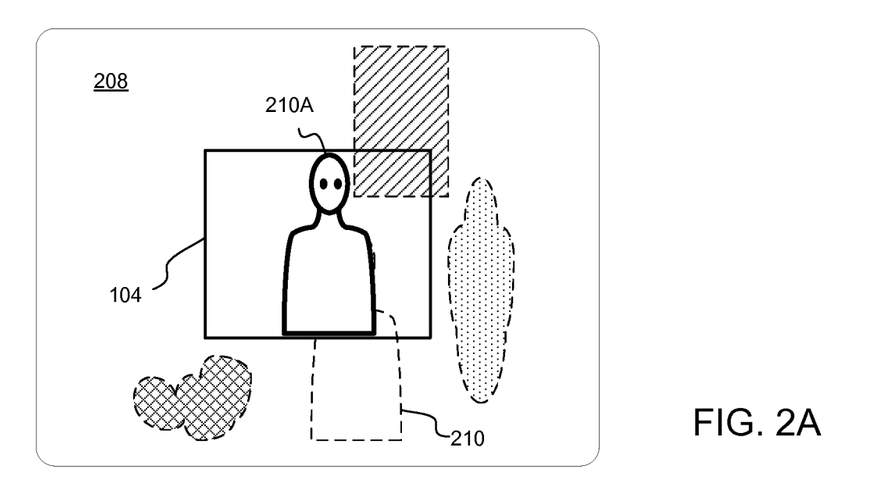
FIG. 2A is a diagram illustrating one example of an image displayed in a transparent display window that is superimposed over an actual view of a surrounding environment as viewed by a user wearing eyeglasses on which an example eyewear display system is attached in accordance with the teachings of the present invention.

FIG. 2A is a diagram illustrating one example of an image 210A projected in a transparent display window 104 that appears to be superimposed over an actual view of a surrounding environment 208 as viewed by the user wearing eyeglasses 106 on which the eyewear display system 100 is attached in accordance with the teachings of the present invention. Referring to FIG. 1 and FIG. 2A, the user wearing eyeglasses 106 may be a person having poor eyesight such that the user is unable to see clearly an object 210 in surrounding environment 208 from a distance. In operation, camera 102 captures an image of object 210 from surrounding environment 208. In operation, the user views an image 210A of object 210 projected in transparent display window 104 of the eyewear display system 100 that is attached to the eyeglasses 106 that the user is wearing. In the example, the user is able to view simultaneously, the image 210A projected in transparent display window 104 as well as the actual view of the surrounding environment 208 in accordance with the teachings of the present invention. In one example, the image 210A appears in the foreground and the actual view of the surrounding environment 208 appears in the background to the user wearing eyeglasses 106 in accordance with the teachings of the present invention.

In the example, the user is able to see more clearly image 210A as projected in the transparent display window 104 than object 210 in the actual view of the surrounding environment 208 from a distance in accordance with the teachings of the present invention. In other words, since the user has poor eyesight, the user will be able to see a clear image 210A projected in transparent display window 104 superimposed over a blurry view of object 210 in the actual view of the surrounding environment 208 as shown in FIG. 2A in accordance with the teachings of the present invention.

Figure 2B:
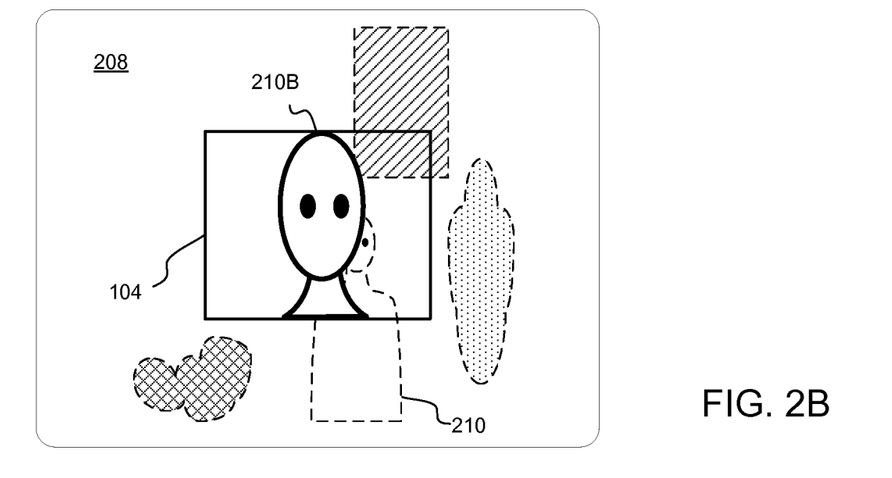
FIG. 2B is a diagram illustrating another example of an image displayed in a transparent display window that is superimposed over an actual view of a surrounding environment as viewed by a user wearing eyeglasses on which an example eyewear display system is attached in accordance with the teachings of the present invention.

Furthermore, image 210A may be scaled digitally or zoomed in optically as shown in FIG. 2B in accordance with the teachings of the present invention. In particular, FIG. 2B is a diagram illustrating another example of an image 210B displayed in a transparent display window 104 that is superimposed over an actual view of a surrounding environment 208 as viewed by a user wearing eyeglasses 106 on which an example eyewear display system 100 is attached in accordance with the teachings of the present invention. Referring to FIG. 1 and FIG. 2B, the user views an image 210B of object 210 projected in transparent display window 104 of the eyewear display system 100 that is attached to the eyeglasses 106 that the user is wearing. In the example, the user is able to view simultaneously the image 210B in transparent display window 104 as well as the actual view of the surrounding environment 208 in accordance with the teachings of the present invention.

In the example, image 210B is a zoomed-in or digitally scaled representation of object 210. Thus, the user is able to see more clearly image 210B as magnified in the transparent display window 104 compared to object 210 in the actual view of the surrounding environment 208 from a distance in accordance with the teachings of the present invention. In other words, since the user has poor eyesight, the user will be able to see clearly the enlarged or magnified image 210B in transparent display window 104 superimposed over a blurry view of object 210 in the actual view of the surrounding environment 208 as shown in FIG. 2B in accordance with the teachings of the present invention.

It is appreciated that transparent display window 104 is not a translucent display such as for example a liquid crystal display (LCD) panel having an image displayed on it. Instead, in one example, transparent display window 104 uses a projector to project a displayed image onto the retina of the user, while the actual view of surrounding environment 208 is also visible to the user. Thus the user will see the projected image and the actual view of surrounding environment 208 simultaneously in accordance with the teachings of the present invention. The projected image appears virtually to the user at a distance from his or her eye through a virtual window. This virtual window is transparent display window 104. Thus, in one example, transparent display window 104 is a virtual exit pupil of eyewear display system 100 in accordance with the teachings of the present invention.

Figure 3:
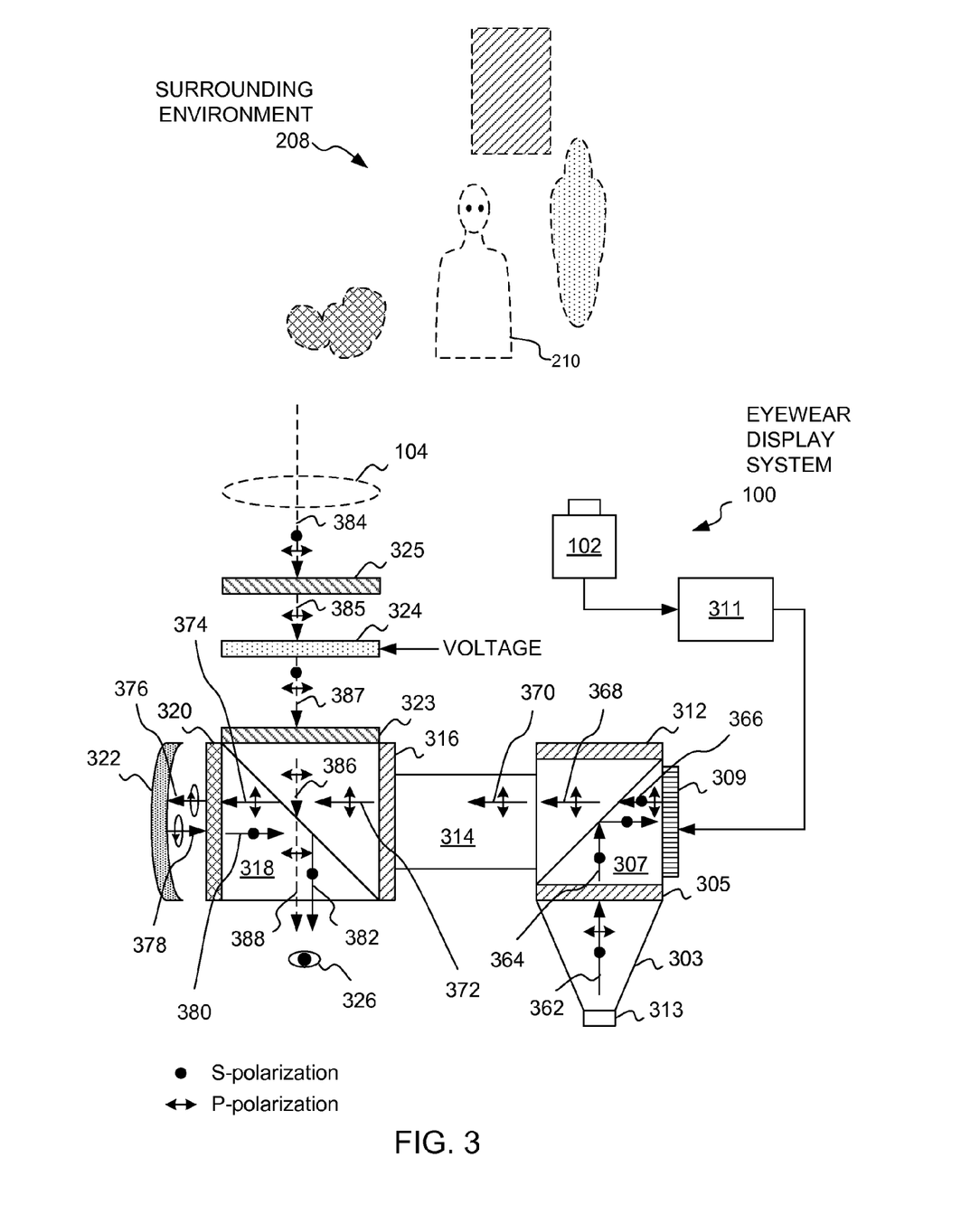
FIG. 3 is an example block diagram illustrating an example of an eyewear display system in accordance with the teachings of the present invention.

FIG. 3 is one example of a block diagram illustrating an eyewear display system 100 in accordance with the teachings of the present invention. As shown in the example depicted in FIG. 3, eyewear display system 100 includes a camera 102 that can capture images of objects, such as for example object 210 in surrounding environment 208. Camera 102 outputs captured image data to a digital processor 311. In one example, digital processor 311 may perform a variety of different processing operations such as for example rescaling or adjusting the magnification of the captured image data. The captured and processed image data is then output from digital processor 311, which is then input to a projector, which in one example is LCOS display 309, for projecting the image captured by camera 202 and processed by digital processor 311.

In one example, eyewear display system 100 is placed in front of an eye 326 of a user by attaching eyewear display system 100 to eyeglasses 106 worn by the user, as illustrated for example in FIG. 1. In the depicted example, an illuminating light source 313 emits illuminating light 362, which is randomly polarized light. In various examples, illuminating light source 313 may include a white light source, a white light LED (light emitting diode), a set of RGB (red, green, blue) LEDs, or any other suitable source of white light. A LCOS display having color filters may be used in a white light mode. A LCOS display having no color filter may be used in a sequential mode, when a set of RGB LEDs are used.

Illuminating light 362 propagates in a light tunnel 303, which may be a solid taper to direct the illuminating light 362 from illuminating light source 313 to a polarizer 305. Randomly polarized illuminating light 362 is passed through polarizer 305, which in the illustrated example is oriented to pass s-polarized light 364 to enter a PBS (polarizing beam splitter) 307. S-polarized illuminating light 364 is reflected by PBS 307 toward LCOS display 309. As shown in the example, reflected light 366 that is reflected from LCOS display 309 has both s-polarization and p-polarization due to the modulation introduced in LCOS display 309. An s-polarization component of light 362 (not shown) is reflected by PBS 307 back toward illuminating light source 313. In the depicted example, the p-polarization component of light 366 that passes through PBS 307 is illustrated as p-polarized light 368 as shown in FIG. 3. Therefore, in the depicted example, p-polarized light 368 represents the captured and processed image that is projected from LCOS display 309. As mentioned previously, the captured and processed image that is projected from LCOS display 309 is the image captured by camera 202 and processed by digital processor 311.

In one example, some p-polarized light (not shown) from illuminating light 362 may leak through polarizer 305, enter PBS 307, and arrive at an optional analyzer 312. Since analyzer 312 is oriented parallel to polarizer 305, the leaking p-polarized light will be blocked by analyzer 312.

The P-polarized light 368 that exits from PBS 307 is shown in FIG. 3 as p-polarized light 370 entering a light tunnel 314. Light tunnel 314 may be an empty space or it may be filled with an optical material. The p-polarized light 370 that passes through optional analyzer 316 and is optically coupled to be received by a PBS 318, which is illustrated as p-polarized light 372. Thus, PBS 318 is optically coupled to receive the projected image from LCOS 309 with p-polarized light 372 in accordance with the teachings of the present invention. Analyzer 316 is oriented to pass p-polarized light. The p-polarized light 372 that passes through PBS 318 is illustrated as p-polarized light 374. P-polarized light 374 arrives at and passes through a quarter-wave plate 320, which is optically coupled to PBS 318, and becomes circularly-polarized light 376. Circularly-polarized light 376 is reflected by a minor 322 and becomes counter-circularly-polarized light 378. In one example, minor 322 may be a Mangin minor 322 that is optically coupled to quarter-wave plate 320. After counter-circularly-polarized light 378 passes back through quarter-wave plate 320 for the second time, it becomes s-polarized light 380. S-polarized light 380 is reflected by PBS 318 toward eye 326 of the user. Thus, in this manner, an image projected from LCOS display 309 is projected to the retina of eye 326 of a user. Therefore, in the depicted example, minor 322 may reflect the image projected from LCOS display 309 for the user to view. In other words, Mangin minor 322 may form an image of LCOS display 309 for the user to view.

In the depicted example, transparent display window 104 is optically coupled to receive randomly polarized light 384 from the actual view of the surrounding environment 208, as illustrated for example in FIG. 1. As shown, randomly polarized light 384 is directed through transparent display window 104 and arrives at a polarizer 325, which in one example is oriented to pass p-polarized light 385 to enter a LCPR (liquid crystal polarization rotator) 324. LCPR 324 rotates the polarization of the light passing through it under the control of an applied electric voltage. Thus light 387, which passes through LCPR 324, may have two components of p-polarization and s-polarization. Light 387 passes through a polarizer 323, which is oriented to pass p-polarized light and enters PBS 318 becoming p-polarized light 386. Thus, PBS 318 is also optically coupled to receive the actual view of the surrounding environment with p-polarized light 386 in accordance with the teachings of the present invention. The s-polarization component of light 387 is absorbed by polarizer 323.

In the depicted example, the intensity of randomly polarized light 384 received from the surrounding environment 208 may be adjusted by LCPR 324 and pair of polarizers 325 and 323 in accordance with the teachings of the present invention. Thus, in one example, an intensity controller, which is provided in one example with LCPR 324 and pair of polarizers 325 and 323, is optically coupled between surrounding environment 208 and PBS 318 to control the brightness of the actual view of the surrounding environment 208 received by PBS 318 in accordance with the teachings of the present invention. In the illustrated example, the reduction of the intensity of light 384 received from the surrounding environment 208 is controlled by adjusting the voltage that is applied to LCPR 324. The p-polarized light 386 that passes through PBS 318, which is illustrated as p-polarized light 388, is directed to the eye 326 of the user.

Therefore, the eye 326 of the user will receive a combined view of the image projected from LCOS display 309 in s-polarized light 382 combined with the actual view of the surrounding environment 208 in p-polarized light 388 in accordance with the teachings of the present invention. The image projected from LCOS display 309 is therefore observed simultaneously with the actual view of the surrounding environment 208 as viewed by the user. In one example, the view projected by LCOS display 309 in s-polarized light 382 will appear in the foreground while the actual view of the surrounding environment 208 in p-polarized light 388 will appear in the background to the eye 326 of the user in accordance with the teachings of the present invention. In one example, the intensity of the actual view of the surrounding environment 208 is controlled by LCPR 324, which is optically coupled between the surrounding environment 208 and the PBS 318, as discussed above. In other examples, it is noted that LCPR 324 and polarizer 325 may be replaced by a neutral density (ND) filter, which may include a variable ND filter, to reduce the brightness of the actual view of the surrounding environment 208.

Therefore, an image captured by camera 202 appears projected in the transparent display window 104 in accordance with the teachings of the present invention. In other words, the user will see the projected image in transparent display window 104. The projected image overlies the actual view of the surrounding environment 208 as shown in FIGS. 2A and 2B. The intensity of the actual view of the surrounding environment 208 can be controlled to provide a natural and comfortable brightness level for the background, which is the actual view of the surrounding environment 208. In one example, the intensity of the image displayed in transparent display window 104 can also be controlled by controlling the brightness of illuminating light 362 emitted by illuminating light source 313. The magnification of the displayed image can be changed by using electronic zoom processing or digital scaling in digital processor 311 or by using an optical zoom included in camera 202 to adjust the magnification of the image. In addition to electronic zoom or digital scaling, digital processor 311 may have other functions and capabilities to perform all corrections and processing required for vision enhancement for people suffering from poor vision.

In one example, it is appreciated that a user may interact with or control eyewear display system 100 with a control panel (not shown) that may be coupled by a cable to eyewear display system 100, or may be coupled by wireless connection such as Bluetooth, etc. It is also appreciated that the control may be voice activated and thus no control panel is required. In one example, the control panel may be mounted on the side of eyewear display system 100 or attached to eyeglasses 106, which may be operated by the user while wearing eyeglasses 106.

Figure 4:
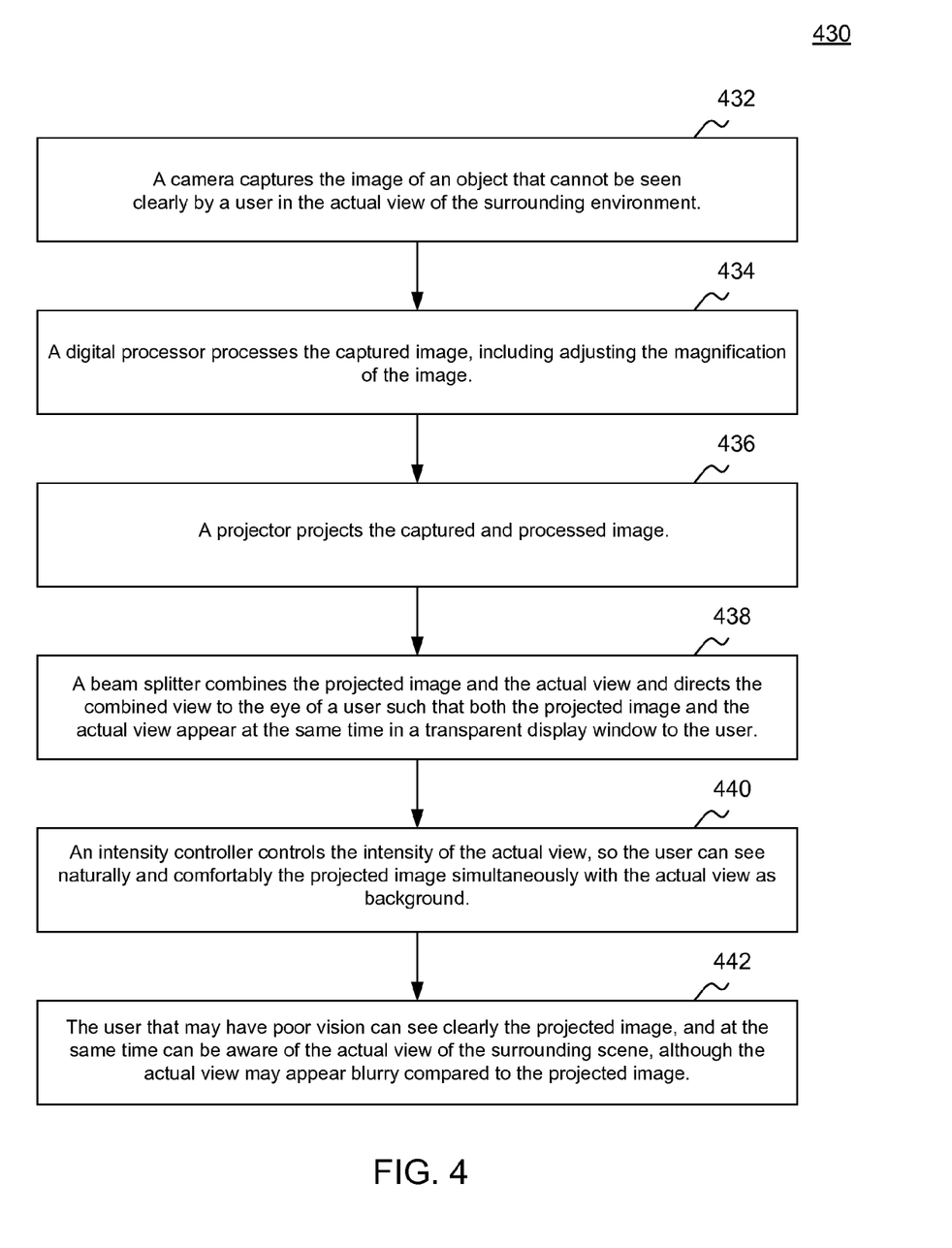
FIG. 4 is a flow diagram illustrating example processing performed with an example eyewear display system in accordance with the teachings of the present invention.

FIG. 4 is a flow diagram 430 illustrating example processing performed with an example eyewear display system, such as for example eyewear display system 100 described above with respect to FIGS. 1-3, in accordance with the teachings of the present invention. As illustrated in FIG. 4, process block 432 shows that a camera captures an image of an object in a surrounding environment that cannot be seen clearly by a user having poor vision. In process block 434, a digital processor processes the captured image, which may include scaling or adjusting the magnification of the image. In process block 436, a projector projects the captured and processed image. In process block 438, a beam splitter outputs a combined view of the projected image from the projector combined with the view of the surrounding environment. The combined view is directed to the eye of the user such that both the projected image and the view of the surrounding environment appear to the user at the same time in a transparent display window. In process block 440, an intensity controller controls the intensity or brightness of the view of the surrounding environment, so the user can see comfortably and naturally the projected image with the view of the surrounding environment as the background. In one example, the intensity controller includes a LCPR or a neutral density filter. In process block 442, the user that may have poor vision can see the projected image clearly, while at the same time can be alert and aware of the actual view of the surrounding environment, even though the actual view of the surrounding environment may appear blurry to the user compared to the projected image.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An eyewear display system, comprising:
a camera coupled to output a captured image in response to capturing an image of an object in a surrounding environment, wherein the camera includes an optical zoom to adjust a first magnification of the image prior to capturing the image;
a projector coupled to receive the captured image to output a projected image;
a polarizing beam splitter optically coupled to receive the projected image from the projector, the polarizing beam splitter further optically coupled to receive an actual view of the surrounding environment, wherein the polarizing beam splitter is optically coupled to output a combined view of the projected image combined with the actual view of the surrounding environment, wherein the combined view is to be directed to an eye of a user;
an intensity controller optically coupled between the surrounding environment and the polarizing beam splitter to control an intensity of the actual view of the surrounding environment received by the polarizing beam splitter, wherein the intensity controller includes a liquid crystal polarization rotator (LCPR) disposed between a pair of polarizers, wherein a second polarizer in the pair of polarizers absorbs an s-polarization component of light from the actual view of the surrounding environment after the light passes through the LCPR; and
a digital processor coupled to receive the captured image from the camera, wherein the digital processor is coupled to digitally scale the captured image to adjust a second magnification of the captured image provided to the projector,
wherein the polarizing beam splitter is a first one of a plurality of polarizing beam splitters, wherein the eyewear display system further comprises a second one of the plurality of polarizing beam splitters optically coupled to receive illuminating light from an illuminating light source, wherein the second one of the plurality of polarizing beam splitters is adapted to direct the illuminating light to the projector, and wherein the second one of the plurality of polarizing beam splitters is optically coupled to direct the projected image from the projector to the first one of the plurality of polarizing beam splitters,
wherein the eyewear display system further comprises a solid taper light tunnel disposed between the illuminating light source and a polarizer, wherein the solid taper light tunnel directs the illuminating light to the polarizer to enter the second one of the plurality of polarizing beam splitters,
wherein a polarization of the projected image is orthogonal to a polarization of the actual view of the surrounding environment in the combined view output by the first one of the plurality of polarizing beam splitters that is directed to the eye of the user, and
wherein the eyewear display system is adapted to be attached to eyeglasses to be worn by the user.

2. The eyewear display system of claim 1, wherein the projector includes a liquid crystal on silicon (LCOS) display, wherein the second one of the plurality of polarizing beam splitters is coupled to reflect the illuminating light to the LCOS display, wherein the LCOS display is optically coupled to receive the reflected illuminating light and in response direct the projected image to the second one of the plurality of polarizing beam splitters, and wherein the second one of the plurality of polarizing beam splitters transmits the projected image to the first one in the plurality of polarizing beam splitters.

3. The eyewear display system of claim 1 further comprises a quarter-wave plate optically coupled to the polarizing beam splitter.

4. The eyewear display system of claim 3 further comprises a Mangin mirror optically coupled to the quarter-wave plate.

5. The eyewear display system of claim 1, wherein the second one of the plurality of polarizing beam splitters is optically coupled to direct the projected image to the first one of the plurality of polarizing beam splitters via transmission.

6. The eyewear display system of claim 1, further comprising:
a mirror coupled to receive the projected image from the first one of the plurality of polarizing beam splitters, wherein the mirror is optically coupled to reflect the projected image back to the first one of the plurality of polarizing beam splitters, and wherein the mirror is positioned off-set from the eye of the user.

7. The eyewear display system of claim 1, wherein the polarizer is a first one of a plurality of polarizers, wherein the eyewear display system further comprises a second one of the plurality of polarizers, wherein the second one of the plurality of polarizers is optically coupled between the mirror and the first one of the plurality of polarizing beam splitters.

8. A method for providing enhanced vision, comprising:

capturing an image of an object in a surrounding environment with a camera of an eyewear display system, wherein the eyewear display system is adapted to be attached to eyeglasses to be worn by a user;

adjusting a first magnification of the image prior to capturing the image, wherein said adjusting the first magnification comprises adjusting an optical zoom included in the camera;

projecting the captured image with a projector, wherein said projecting the captured and adjusted image with the projector comprises projecting the captured and adjusted image with a liquid crystal on silicon (LCOS) display;

illuminating the LCOS display with illuminating light directed from a first polarizing beam splitter, wherein said illuminating light is directed from an illuminating light source through a solid taper light tunnel disposed between the illuminating light source and a polarizer, wherein the solid taper light tunnel directs the illuminating light to the polarizer to enter the first polarizing beam splitter;

combining the projected image from the projector with an actual view of the surrounding environment with a second polarizing beam splitter, wherein a polarization of the projected image is orthogonal to a polarization of the actual view of the surrounding environment;

directing a combined view of the projected image from the projector with the actual view of the surrounding environment to an eye of the user; and controlling an intensity of the actual view of the surrounding environment, wherein said controlling the intensity of the actual view of the surrounding environment comprises adjusting a voltage applied to a liquid crystal polarization rotator (LCPR) disposed between a pair of polarizers, wherein a second polarizer in the pair of polarizers absorbs an s-polarization component of light from the actual view of the surrounding environment after the light passes through the LCPR.

9. The method of claim 8, further comprising:

adjusting a second magnification of the captured image, wherein said adjusting the second magnification comprises digitally scaling the captured image from the camera with a digital processor.

10. The method of claim 8 wherein said capturing the image of the object in the surrounding environment comprises capturing an image of an object in the surrounding environment that cannot be seen clearly by the user.

11. The method of claim 8 wherein said directing the combined view of the projected image from the projector with the actual view of the surrounding environment to the eye of the user comprises directing the combined view of the projected image from the projector with the actual view of the surrounding environment to a retina of the user.

* * * * *